United States Patent [19]

Chandler et al.

[11] Patent Number: 4,515,354
[45] Date of Patent: May 7, 1985

[54] FIXTURE FOR ASSEMBLING PINS INTO A SHUTTLE

[75] Inventors: Donald E. Chandler, Colonial Heights; William M. Chisholm, Midlothian; Ralph T. Lechner, Richmond, all of Va.

[73] Assignee: AT&T Technologies, Inc., New York, N.Y.

[21] Appl. No.: 417,717

[22] Filed: Sep. 13, 1982

[51] Int. Cl.³ .............................................. B23Q 3/00
[52] U.S. Cl. .................................. 269/15; 269/289 R; 269/307; 269/903; 29/760
[58] Field of Search ................ 269/903, 309, 310, 295, 269/15, 303, 289 R, 307; 29/739, 759, 760, 747, 837, 838, 839, 884

[56] References Cited

U.S. PATENT DOCUMENTS

| | | | |
|---|---|---|---|
| 3,769,679 | 11/1973 | Kendall. | |
| 3,800,416 | 4/1974 | Shultz et al.. | |
| 3,858,293 | 1/1975 | Weston. | |
| 3,946,477 | 3/1976 | Cobaugh et al.. | |
| 4,035,897 | 7/1977 | Over et al. | 29/760 X |
| 4,125,935 | 11/1978 | Ammon | 29/739 X |
| 4,149,311 | 4/1979 | Benson et al. | 29/759 X |
| 4,201,374 | 5/1980 | Gras | 269/303 X |
| 4,274,195 | 6/1981 | Sporer | 29/759 X |
| 4,291,867 | 9/1981 | Williams et al. | 29/760 X |
| 4,328,613 | 5/1982 | Kirkpatrick | 29/837 |

Primary Examiner—Frederick R. Schmidt
Assistant Examiner—Steven P. Schad
Attorney, Agent, or Firm—W. G. Dossé; G. W. Houseweart; S. I. Rosen

[57] ABSTRACT

A fixture (60) for holding a pin-supporting shuttle (54) during assembly therein of terminal pins (20) for later insertion into a rigid board is formed with a sloping work surface (66) including a plurality of locating pins (68 and 70) for holding the shuttle (54) in two dimensions and a plurality of hold-down clips (74) for engagement with a groove (76) in the shuttle. A locking bar (72) positioned above the shuttle (54) is movable toward and away from the shuttle and carries a guide (136) for the location of assemblies (44 or 52) of terminal pins (20) in the shuttle. When the shuttle (54) has been fully loaded, the locking bar (72) is moved toward the shuttle to operate a securing mechanism (116) of the shuttle to secure the terminal pins (20) into the shuttle. A break-off groove (84) is located above a scrap chute (86) and is used for breaking pin-carrier strips (40 and 42) from the shuttle-mounted pin (20) after assembly. A tray (100), containing adjustable compartment, is mounted above the work surface (66) for holding the several pin assemblies (44 and 52) prior to assembly.

3 Claims, 10 Drawing Figures

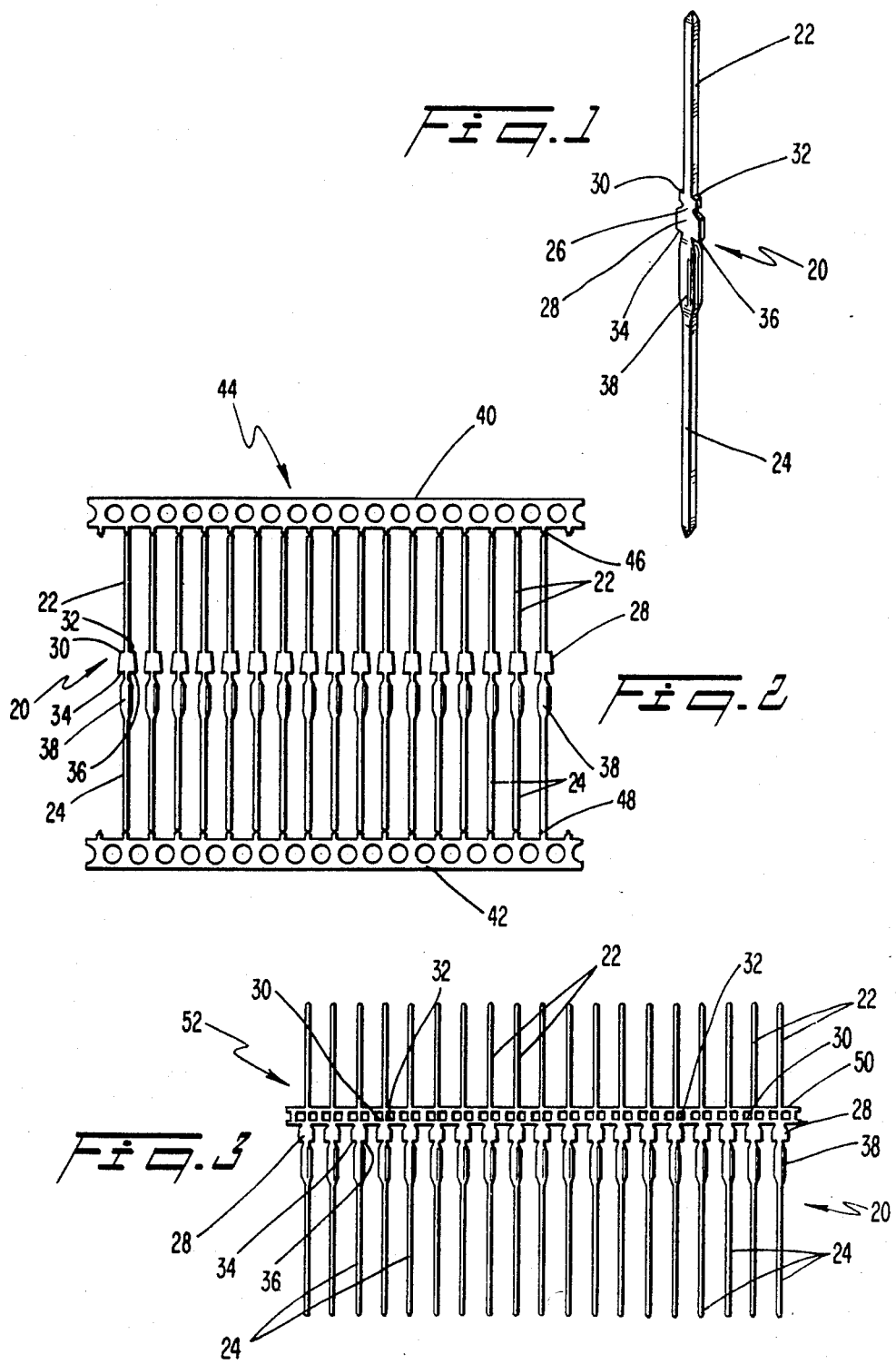

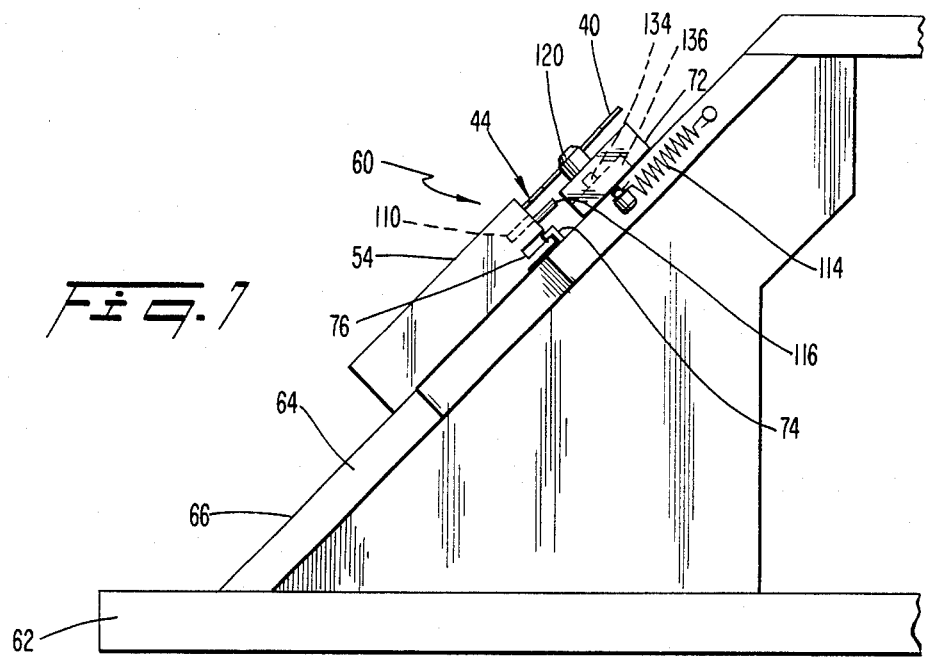
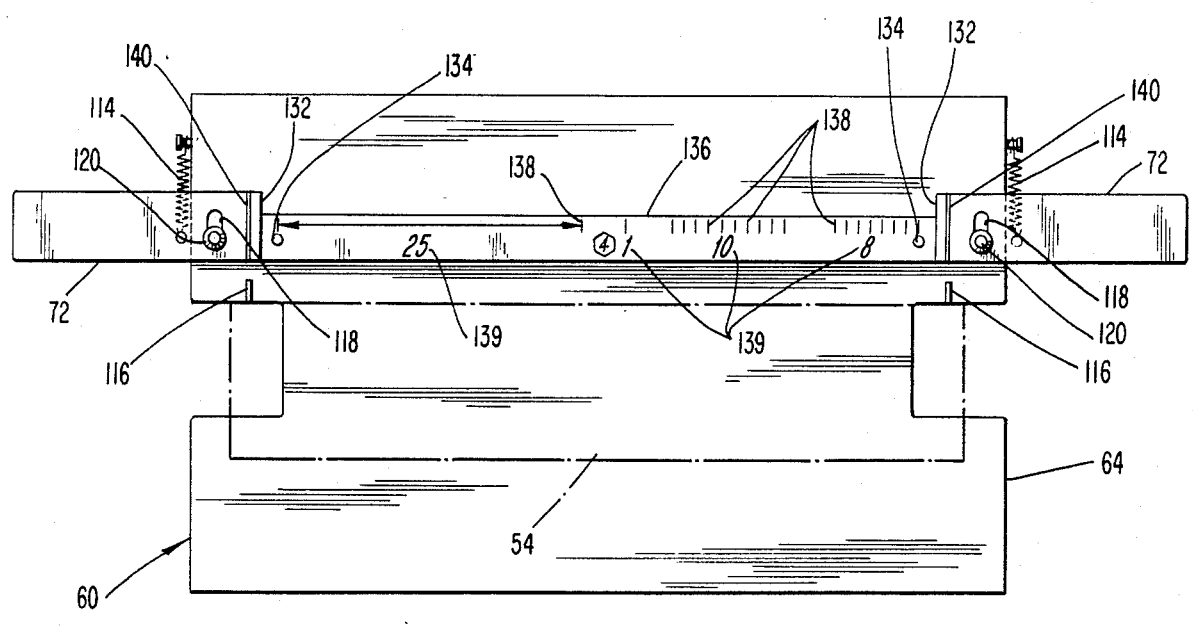

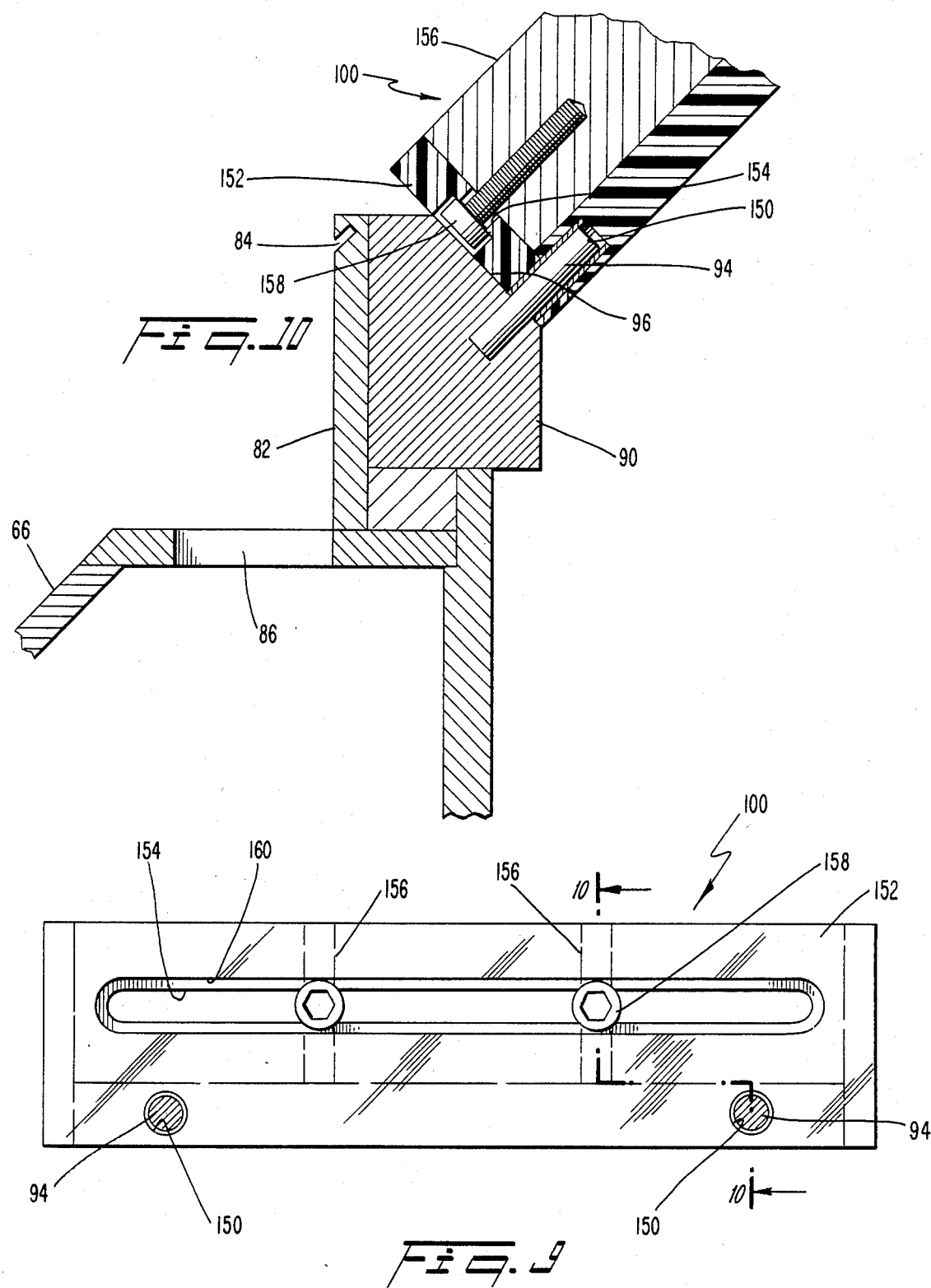

FIXTURE FOR ASSEMBLING PINS INTO A SHUTTLE

TECHNICAL FIELD

This invention relates to pin insertion and more particularly to a fixture for assembling pins into a pin-carrying shuttle to facilitate later insertion of the pins into an apparatus.

BACKGROUND OF THE INVENTION

In the manufacture of some types of rigid, pin-populated printed wiring boards, terminal pins are inserted into apertures in the board and electrically engage portions of printed wiring on the boards to provide for connections to electrical circuits. Typically, the spacing between adjacent apertures is extremely small. For example, the spacing between apertures on one board is 0.125 inch. Moreover, each terminal pin typically has a square cross section of, for example, 0.025 inch, except in those areas where the pin is formed with lateral ears having a push shoulder and an aperture-engaging portion intermediate the ends thereof.

Due to the close spacing between apertures and the small size of the pins, it is most difficult and tedious to assemble the pins into the boards on an individual basis. Additionally, the relatively small size of the pins necessitates delicate handling prior to and during insertion of the pins into the apertures in the board. However, where each board may contain thousands of closely-spaced apertures, efficiency and economy dictate that the pins be prealigned and gang-inserted into the board apertures.

Typically, terminal pins are manufactured by forming them transversely across continuous strips of sheet stock in a parallel array with opposite ends of the pins interconnected by opposed parallel end carriers to form a continuous terminal strip. With the pins still adhering to the end carriers, the pins can be transported in large rolls. A number of pins, with end carriers still attached, can be taken from a roll of pins by merely shearing the end carriers at an appropriate point. Such short strips of pins, with one or both end carriers still attached, are often referred to as "pin combs" or "pin assemblies." To assemble the pins into a printed wiring board, one of the end carriers is separated from insertion ends of the pins and the other end carrier may be used as a pusher member to insert the separated ends into apertures in the board. After the assembly operation, the remaining end carrier is separated from the other ends of the terminal pins.

In an alternative technique, one of the end carriers is removed and the pins are assembled into a pin-carrying shuttle of the type disclosed in a copending application for U.S. patent in the sole name of W. M. Chisholm, Ser. No. 326,103, filed on Nov. 30, 1981, now U.S. Pat. No. 4,398,628 (which is a continuation-in-part of Ser. No. 192,271 filed on Sept. 30, 1980, now abandoned). Such a shuttle carries terminal pins arranged to populate a transverse row on a board. Once the pins are firmly positioned or secured in the shuttle, the other end carrier can be broken from the pin ends; and the shuttle can be stored, carried and arranged in a multi-purpose transport tray of the type shown in a copending joint U.S. patent application Ser. No. 373,191 filed on Apr. 29, 1982, now abandoned, in the name of W. M. Chisholm et al.

Alternatively, the parallel strip of terminal pins can be manufactured with single carriers connecting the bodies of the pins intermediate the ends thereof and located between each successive pin in the strip. Once the pins have been assembled and secured into a shuttle of the type shown in the above-mentioned Chisholm sole application, the body carriers of the pins can be removed in a punch and die set.

SUMMARY OF THE INVENTION

In accordance with the present invention, a fixture for assembling pins into a shuttle and for securing the pins into the shuttle comprises a work surface; a plurality of locating pins on the work surface for engaging locating recesses within a shuttle that is placed on the work surface; means for limiting movement of the shuttle away from the work surface; and a locking bar slidably mounted on the work surface for limited movement toward and away from the shuttle on the work surface and for securing the pins into the shuttle upon movement of the locking bar toward the shuttle.

BRIEF DESCRIPTION OF THE DRAWINGS

FIG. 1 is a perspective view showing a terminal pin;

FIG. 2 is a front view showing a plurality of pins of FIG. 1 held in a uniform spacing by end-carrier strips;

FIG. 3 is a front view showing a plurality of pins of FIG. 1 held in a uniform spacing by body-carriers;

FIG. 7 is a partial side view of the work surface of the assembly fixture with shuttle shown schematically and with the locking bar shown in place on the work surface;

FIG. 8 is a view of the work surface with the locking bar having a shuttle-loading guide mounted on the central portion of the locking bar and with a shuttle shown in phantom to illustrate its relationship to the locking bar and guide;

FIG. 9 is an end view of a pin assembly tray illustrating how the tray is adjusted to accommodate the different sizes of assemblies of terminal pins; and FIG. 10 is a partial view of the tray in section taken along line 10—10 of FIG. 9 and showing the tray mounted on the fixture.

DETAILED DESCRIPTION

Figure 6:
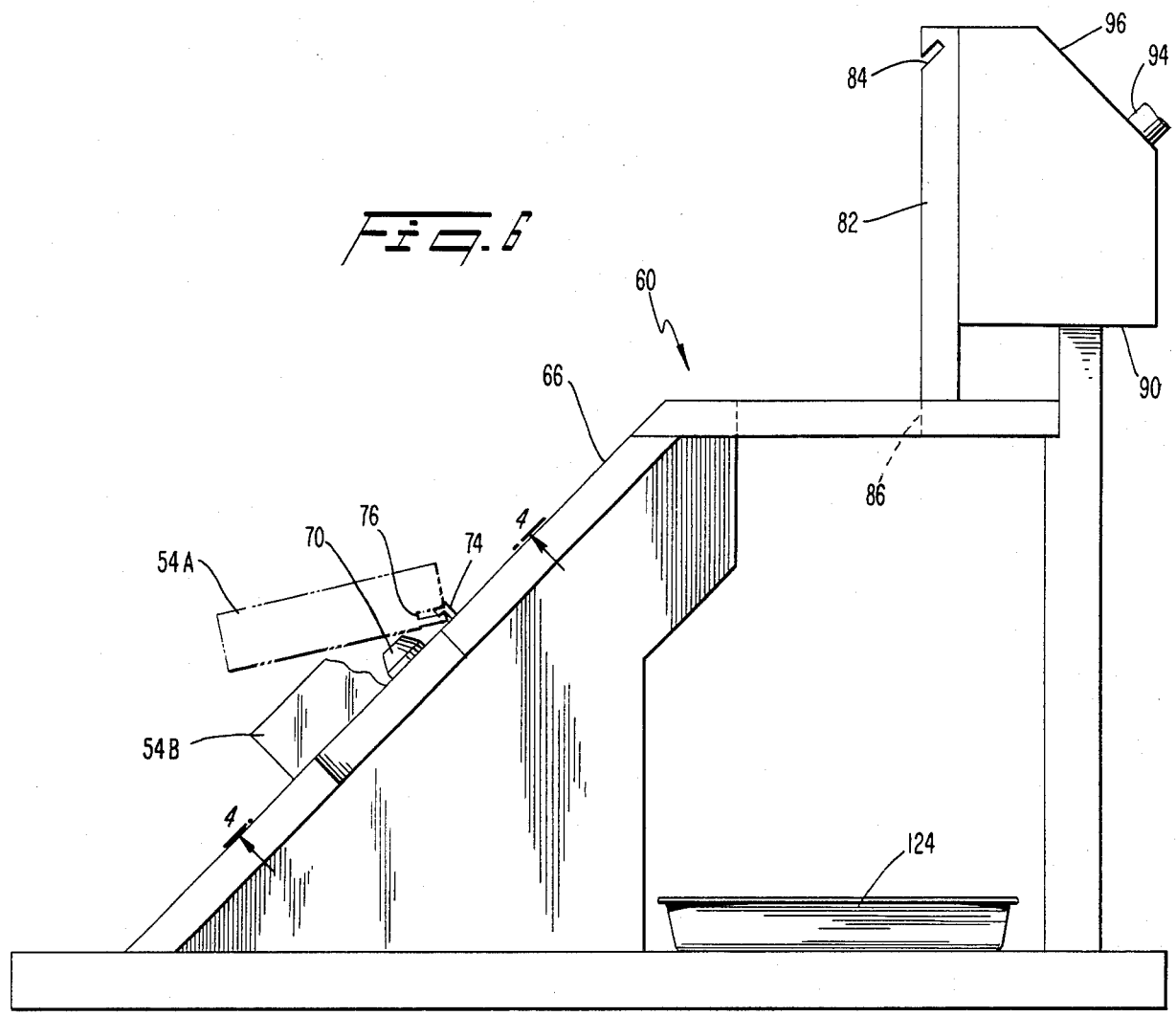
FIG. 6 (on the same sheet as FIG. 4) is a side view of the assembly fixture of FIG. 5 with the locking bar omitted and schematically showing a shuttle in phantom in two positions, one position being at the initial point of mounting the shuttle on the fixture and the other position (only partially shown) being of the shuttle mounted on the fixture.

Referring to FIG. 1, there is illustrated a terminal pin, designated generally by the numeral 20. The terminal pin 20 is formed from blank stock (not shown) to include axially-aligned shank portions 22 and 24 at opposite ends thereof. The end of the shank portion 24 is to be inserted into one of a plurality of apertures (not shown) of a printed wiring board (not shown) while the end of the shank portion 22 extends from the board for receiving a connector housing (not shown). Lateral ears 26 and 28 are formed intermediate the ends of the pin 20 adjacent the shank portion 22 and include shoulder or push surfaces 30 and 32, respectively, closest to the shank portion 22 and undersurfaces 34 and 36, respectively, closest to the shank portion 24. The pin 20 is also formed with a board-engaging, pin-retaining portion 38 which is eventually located within one of the apertures of the printed wiring board and is designed to facilitate retention of the pin with the board but also permit the pin to be removed from the aperture.

Referring to FIG. 2, there is illustrated a plurality of terminal pins 20 which have been formed in a predetermined, uniform spacing from blank stock (not shown) during a punching and stamping operation. The pins 20 are held in the uniform spacing by integrally attached end-carrier strips 40 and 42 also formed from the blank stock in the same punching and stamping operation. The pins 20 and end-carrier strips 40 and 42 form an end-carried pin assembly designated generally by the numeral 44. The ends of the shank portions 22 and 24 of the pins 20 which are linked integrally with the end-carrier strips 40 and 42, respectively, are scored at points 46 and 48, respectively, to facilitate subsequent easy removal of the strips from integral attachment with the pins.

Referring to FIG. 3, there is illustrated a plurality of terminal pins 20 which have been formed in a predetermined uniform spacing from blank stock (not shown) during a punching and stamping operation. The pins 20 are held in the uniform spacing by integrally-formed, intermediate or body-carrier webs or carriers 50 also formed from the blank stock in the same punching and stamping operation. The pins 20 and the carriers 50 form a body-carried pin assembly designated generally by the numeral 52. The pins 20 of the assembly 52 also include shank portions 22 and 24, lateral ears 26 and 28, shoulder or push surfaces 30 and 32, undersurfaces 34 and 36 and a pin-retaining portion 38. Upper portions of the lateral ears 26 and 28 are linked integrally with the carriers 50. The carriers 50 could be scored to facilitate easy removal thereof.

Figure 4:
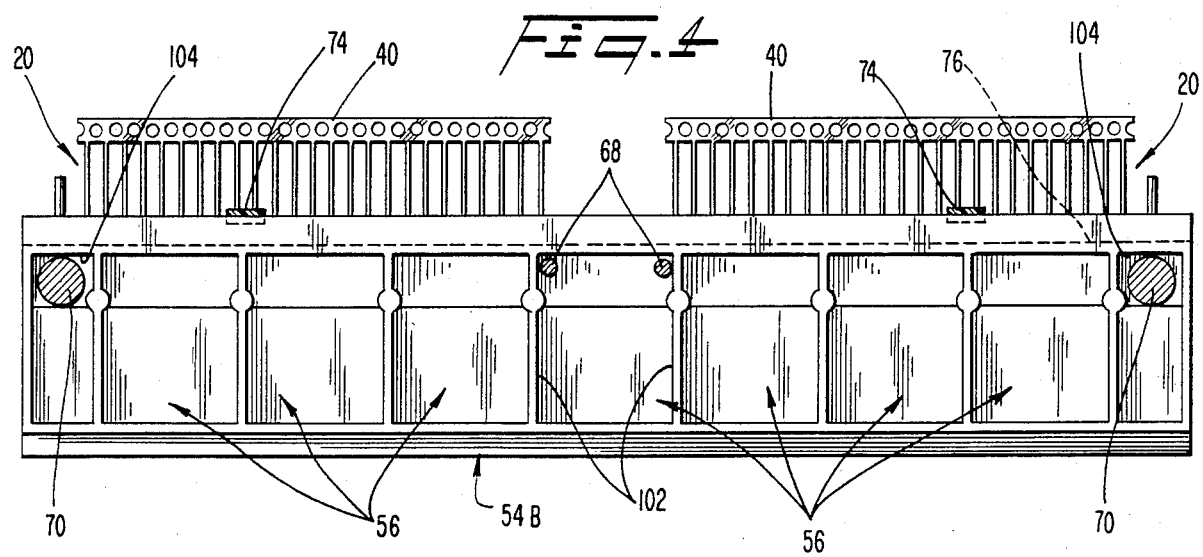
FIG. 4 is a rear view of a shuttle, as though viewed from the line 4—4 in FIG. 6, showing terminal pins in place and recesses to accommodate the shuttle to the assembly fixture of the present invention, and showing how a plurality of locating pins and hold-down clips on the fixture engage the recesses and other portions of the shuttle.

Referring to FIG. 4, there is illustrated a pin supporting shuttle, designated generally by the numeral 54. The shuttle 54 facilitates retention of the pins 20 in the uniform spacing during and after the removal of the end-carrier strip 40 or the body-carrier 50 (FIG. 3). The shuttle 54 also facilitates the later transfer of the pins 20, while maintaining the uniform spacing, into an insertion apparatus (not shown) for insertion of the pins 20 into apertures of a printed wiring board.

The rear of the shuttle 54 (shown in FIG. 4) has a plurality of recesses 56 which serve not only to conserve material and lighten the shuttle structure but also to facilitate mounting and alignment of the shuttle 54 in the assembly fixture of the present invention, as will be described more fully below.

Figure 5:
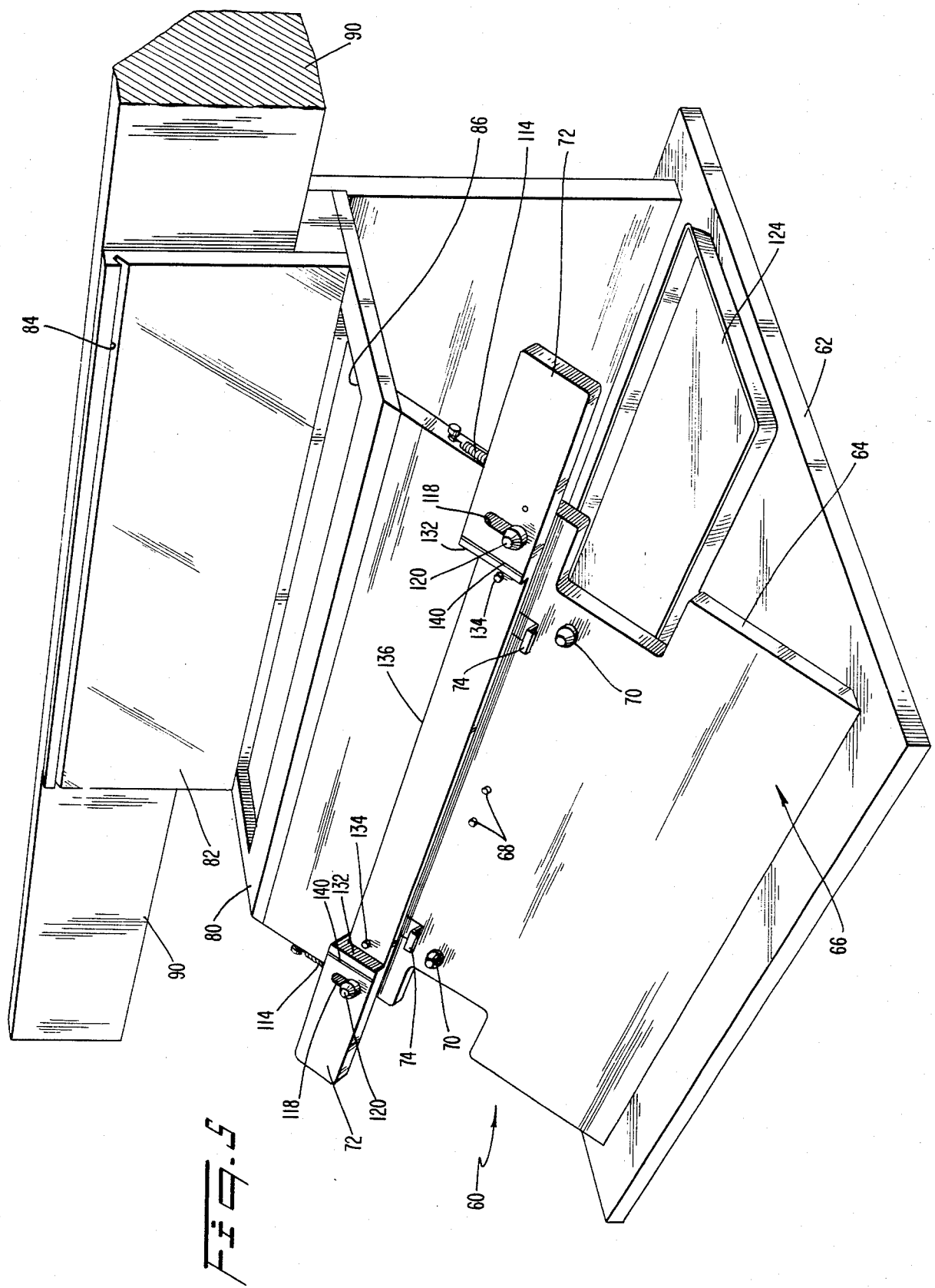
FIG. 5 is a perspective view of an assembly fixture according to the present invention.

Referring now to FIG. 5, an assembly fixture 60 is shown in perspective and comprises a base 62 which, for steadiness and stability, can be firmly mounted to a workbench by bolts, screws, or other fasteners. A plate 64 having an upper work surface 66 is obliquely mounted on the base 62, so as to arrange the work surface at an angle convenient for an operator. Two lateral locating pins 68 project from surface 66 and are arranged to engage the sides of a recess 56 in a pin-carrying shuttle 54, to prevent the shuttle from moving laterally (i.e., from side to side) on the surface. Two orthogonal locating pins 70 are also located on the plate 64 and project from the surface 66 for preventing shuttle movement in a downward direction (orthogonal to the lateral direction) along the slope of the surface. A locking bar 72 is slidably mounted on the surface 66 for movement along the slope of that surface. Two hold-down clips 74 are located with respect to the surface 66 for engaging a hold-down groove 76 (FIGS. 4, 6, and 7) in the shuttle 54 (FIGS. 4 and 6). The hold-down clips 74 limit upward movement of the shuttle 54, along the slope of the surface 66 and also limit movement of the shuttle away from the surface.

A cross plate 80 of the fixture 60 provides a mounting for an upstanding plate 82 that contains an angled end-carrier break-off groove 84 that is used for breaking the end carriers 40 from the end-carried terminal pin assemblies 44 after the pins 20 have been locked or secured into the shuttle 54. An end-carrier-receiving chute 86 comprises an opening cut in the cross plate 80 and allows the pin assembly end carriers 40 to fall out of the way after they are broken from the pins 20 using the end-carrier break-off groove 84.

A tray-holding bar 90 is mounted above the cross plate 80 and behind the upstanding plate 82. A pin-assembly-holding tray 100 (not shown in FIG. 5, but shown in FIGS. 9 and 10) can be mounted on the tray-holding bar 90 for holding a supply of pin assemblies 44 with the end carriers 40 and 42 or the body carriers 50 attached.

Referring now to FIG. 6, a side view is shown of the fixture 60 of FIG. 5, one of the two orthogonal locating pins 70 and one of the two hold-down clips 74 are shown projecting from the surface 66. An empty shuttle 54 is shown in phantom in a first position, designated by the reference number 54A, at which position the shuttle is first being mounted on the fixture 60. The hold-down groove 76 formed in the shuttle 54 is engaged with the hold-down clip 74. The shuttle 54 is then pressed toward the hold-down clip 74 while being rotated counterclockwise (as viewed in FIG. 6) until the shuttle is in a position designated by the reference number 54B. At the position 54B, the shuttle 54 is resting against the surface 66 with the hold-down groove 76 firmly engaged by the hold-down clips 74. One of the two orthogonal locating pins 70 is positioned within one of the recesses 56 on the bottom or back surface of the shuttle 54.

Referring to another portion of FIG. 6, a tray-mounting pin 94, one of several, projects at an angle from the tray-holding bar 90 perpendicular to an angled surface 96 of the tray-holding bar. A pin-assembly-holding tray 100 (FIGS. 9 and 10) contains openings to accommodate the tray-holding pins 94 and to slide over the pins until the tray 100 rests against the angled surface 96. The tray-holding bar 90 can be long enough and contain enough tray-mounting pins 94 to accommodate several trays 100 of pin assemblies 44 or 52.

Referring again to FIG. 4, the bottom or rear view of the shuttle 54 is shown as it would appear when viewed from the direction of the arrows 4—4 in FIG. 6. The locating pins 68 and 70 and the hold-down clips 74 of the fixture 60 are also shown in FIG. 4 to illustrate how these locating pins and clips engage the recesses 56 in the rear or bottom surface and the hold-down groove 76 of the shuttle 54 to locate and retain the shuttle in position on the surface 66 during the installation and securing of the terminal pins 20 in the shuttle. The recesses 56 are deep enough into the shuttle 54 to accommodate the locating pins 68 and 70. The lateral locating pins 68 are positioned on the surface 66 so as to very nearly abut the opposite side edges 102 of one of the recesses 56, thus preventing all but insignificant left-to-right movement of the shuttle 54 as viewed in FIG. 4. The orthogonal locating pins 70 are positioned on the surface 66 of the fixture 60 so as to engage the upper edges 104 of the two opposite end recesses 56 in the shuttle 54 and thus limit downward movement of the shuttle as viewed in FIG. 4. The hold-down clips 74 limit upward movement of the shuttle 54 as viewed in FIG. 4.

Referring now to FIG. 7, there is shown a partial side view of the fixture 60 with a shuttle 54 mounted in place on the surface 66. To manually load terminal pins 20 into the shuttle 54, the operator selects a pin assembly 44 having the desired number of pins 20 between two end carriers 40 and 42 (FIG. 2). Alternatively, a body-carried pin assembly 52 (FIG. 3) can be selected. If an end-carried pin assembly 44 is selected, the end-carrier strip 42 is broken from the ends of the pins 20, using a break-off groove 110 arranged parallel with the hold-down groove 76 and formed in the top edge of the shuttle 54. The broken-off carrier 42 remains temporarily in the break-off groove 110, and the operator inserts the remainder of the pin assembly 44 into the appropriate location in the shuttle 54.

When the shuttle 54 has been satisfactorily loaded with terminal pins 20, the operator grasps the ends of the locking bar 72 and pulls the locking bar against the tension bias of two springs 114 (FIGS. 5 and 7) located near the ends of the locking bar, driving the locking bar down onto a pair of locking pins 116 of the shuttle. As disclosed more fully in the above-mentioned Chisholm sole application, movement of the locking pins 116 to the lower left in FIG. 7 locks or secures the terminal pins 20 into the shuttle 54.

Referring to FIGS. 7 and 8, the locking bar 72 has two limit slots 118. A pair of headed guide pins 120 are mounted through the limit slots 118 and into the plate 64. The limit slots 118 cooperate with the headed guide pins 120 to limit the extent of movement of the locking bar 72.

Upon release of the locking bar 72 by the operator, the springs 114 pull the locking bar away from the shuttle 54. The shuttle 54 can then be removed from the fixture 60 by rotating the shuttle clockwise as viewed in FIGS. 6 and 7 to release the shuttle from the locating pins 68 and 70 and from the hold-down clips 74. The operator then has, in hand, the loaded and locked shuttle 54 and moves the shuttle until the end-carrier strip 40 of the end-carried pin assembly 44 that was loaded into the shuttle is positioned in the angled, carrier-breaking groove 84. An upward or clockwise (as seen in FIG. 6) movement of the shuttle 54 will break the end carrier 40 from the terminal pins 20 now firmly secured in the shuttle. Some flexing up and down around the angled carrier-breaking groove 84 may be necessary to assure that all of the connections between the end carrier 40 and the terminal pins 20 have been broken. The severed end carrier 40 from the angled carrier-breaking groove 84 and the other end carrier 42 in the break-off groove 110 of the shuttle 54 will fall through the pin-carrier-receiving chute 86 to some convenient waste receptacle such as a pan 122 (FIG. 6). The loaded and locked shuttle 54 is then placed in a selected one of the transport trays 100 such as that disclosed in the above-mentioned Chisholm et al. joint application.

An example has been described wherein only a single end-carried pin assembly 44 was loaded into a shuttle 54. In a typical manufacturing environment, several end-carried pin assemblies 44 are loaded at various locations across a shuttle (as viewed in FIG. 4). The end carriers 40 of these several pin assemblies 44 will then be broken from their associated pins 20, using the angled carrier-breaking groove 84, in a single movement.

SHUTTLE-LOADING GUIDE

As previously described, a single shuttle 54 holds the pins 20 that are intended to populate only a single row of pin-location-perforations in a printed wiring board (not shown). Each shuttle 54 might hold as many as sixty terminal pins 20 on 0.125 inch centers, with terminal pins being inserted from successive shuttles in successive rows on 0.125 inch centers. Therefore, almost 500 pins per inch of board length are possible. It is conceivable that almost 10,000 pins could be mounted in a single board.

If each shuttle 54 were fully filled with pins 20 of the same type, leaving no vacant spaces and if each row were to be filled with pins of exactly the same type from a fully-loaded shuttle, little guidance would be needed for the operator in loading terminal pins into shuttles in the present fixture 60. However, in practical electronic devices, terminal pins of various lengths and several different types may all be loaded at different locations on a printed writing board (not shown). Therefore, the loading of shuttles 54 may be an extremely complex operation with each shuttle having two, three, four or more different types or numbers of pins 20 being loaded in different portions of a shuttle and with gaps between selected groups of pins—these gaps, of course, containing no pins. Several shuttles 54 having identical pin arrangements might be needed for inserting rows of pins 20 at various row locations on a board; and there might be many different arrangements of pins in the many shuttles used variously in the manufacture of a pin-populated board.

An operator of high skill and capability, with due care and attention, might be able to load a large number of shuttles 54 reliably and with a very low error rate using blueprints or other manufacturing drawings. However, to achieve the best results in a practical factory environment, the operator should be given the maximum assistance in selecting an appropriate assembly of pins 20 of the appropriate type and then inserting them in exactly the correct location within the shuttle 54.

Referring now to FIGS. 7 and 8 of the drawings, the locking bar 72 contains a recessed portion 130 between a pair of internal edges 132. Two locating pins 134 project upward from the base of the recessed portion 130 to form an accommodation for operator-assistance, shuttle-loading guides 136, in the form of strips, which are mounted in the recessed portion on the locking bar 72 and extend between the internal edges 132. One of the indicator guides 136 is shown in position on the locking bar 72 in FIG. 8. The guide 136 can be a very thin piece of metal or cardboard with the arrangement and types of pins marked as colored lines or markings 138 on the guide. The guide 136 has two holes to accommodate the mounting pins 134. The colored markings 138 are aligned with the pin-receiving slots (not shown) in the shuttle 54. The color of each marking 138 indicates the type of pin 20 that is to be placed in an associated pin-receiving slot in the shuttle 54. A number (designated by the reference number 139), below the markings 138 of a given color, indicates the number or quantity of pins 20 in the associated pin assembly 44 or 52 that will be inserted in those associated pin-receiving slots (not shown). The colors are chosen according to an arbitratory pattern or program which matches the desired pin arrangements in the printed wiring board. Various markings can be placed on the face of the guide 136 to indicate the type of pin arrangement and how many shuttles of that pin arrangement will be used in each printed wiring board. In this way, the operator need merely note the number and the color of a group of markings 138, find a corresponding pin assembly in the tray 100 (FIGS. 9 and 10) nearby, having the same number or quantity of that type of pin. Preferably, the corresponding pin assembly 44 or 52 will be in a location in the tray 100 that has been marked with the same color as the markings 138 on the guide 136. The operator will then proceed to break off the end carrier 42 (in the case of an end-carried pin assembly 44) and insert that assembly of pins 20 in the pin-receiving slots (not shown) of the shuttle 54 that are directly in line with the correspondingly colored markings 138.

Alignment marks 140 on the locking bar 72 aid in mounting a shuttle 54 in the fixture 60. The operator need merely align the locking pins 116 of the shuttle 54 with the alignment markings 140 on the locking bar 72 when mounting the shuttle in the fixture 60 as described in connection with FIG. 6.

ADJUSTABLE TRAYS

Referring now to FIGS. 9 and 10, there is shown an end view and partial, cross-sectional side view, respectively, of the pin assembly storage or stock tray 100 intended for use with the present fixture 60. Refer is also made to the angled surface 96 and the tray-holding pin 94 shown in FIG. 6. The end of the tray 100 that is illustrated in FIG. 9 contains two mounting holes 150. These mounting holes 150 are arranged such that the tray 100 can be placed on the tray-holding bar 90 by slipping the mounting holes over the tray-holding pins 94 until a surface 152 of the tray rests against the angled surface 96 of FIG. 6. The holes 150 preferably contain a bushing to resist wear.

The end of the tray 100 contains a slot 154 running most of the width of the tray. A comparable slot is at the opposite end (not shown) of the tray. The tray 100 contains a plurality of dividers 156, two of which are illustrated in FIG. 9. A fastener 158 at each end of a divider 156 projects through its associated slot 154 so as firmly to hold its associated divider in place. In this way, the tray 100 has adjustable-width compartments to accommodate the various lengths of pin assemblies 44 and 52. The surface 152 has a recess 160 around the slot 154 to accommodate the heads of the fasteners 158 in order to permit the surface to rest flush on the surface 96.

What is claimed is:

1. A fixture for facilitating the assembly of end-carried terminal pins into a shuttle having securing means for securing terminal pins within the shuttle upon actuation of the securing means, comprising:

a work surface;

a locking bar slidably mounted on the work surface for limited movement in a path toward and away from the shuttle on the work surface, and for actuation of the securing means upon movement toward the shuttle;

at least two lateral locating pins on the fixture arranged to engage two surfaces of recesses in the shuttle to limit movement of the shuttle in a direction perpendicular to the path of movement of the locking bar;

at least one orthogonal locating pin on the fixture to engage at least one surface within a recess of the shuttle to limit movement of the shuttle in a direction parallel with the path of movement of the locking bar;

a plurality of hold-down clips for engaging a hold-down groove of the shuttle;

a terminal-pin-holding tray mounted with respect to the work surface;

a groove for breaking end carriers from shuttle-mounted pins; and a pin-end-carrier-receiver chute located under the end-carrier-breaking groove.

2. A fixture for facilitating the assembly of pins into a shuttle having locating recesses therein and securing means for securing pins into the shuttle upon actuation of the securing means, the fixture comprising:

a work surface;

a plurality of locating pins on the work surface for engaging the locating recesses when the shuttle is placed on the work surface;

a locking bar slidably mounted on the work surface for limited movement toward and away from a shuttle on the work surface, and for actuation of the securing means upon movement toward the shuttle;

means for limiting movement of the shuttle away from the work surface; and a groove with a length substantially at least equal to the length of a shuttle and wide enough easily to receive and constrain rotation of the terminal-pin end carriers of pins locked in a shuttle and, upon rotation of the shuttles about the groove, bending and flexing the attachment between the terminal-pin end carriers and the shuttle-mounted pins, thereby breaking terminal-pin end carriers from shuttle-mounted pins.

3. A fixture according to claim 2 further having a terminal-pin-end-carrier-receiving chute located under the end-carrier-breaking groove.

* * * * *